March 2, 1954   G. W. H. SUSSDORFF ET AL   2,670,826
CLUTCH
Filed July 23, 1946

Inventor
G. W. H. SUSSDORFF
HARRY D. GOODNOW

By   M. A. Hayes

Attorney

Patented Mar. 2, 1954

2,670,826

UNITED STATES PATENT OFFICE 2,670,826

CLUTCH

George W. H. Sussdorff, Newington, Conn., and Harry D. Goodnow, Melrose, Mass., assignor, by mesne assignments, to the United States of America as represented by the Secretary of the Navy Application July 23, 1946, Serial No. 685,586

1 Claim. (Cl. 192—48)

The present invention relates broadly to a gear train for tracking a gun sight and more particularly to a means for changing the gear ratio thereof.

Customarily the tracking range for gun sights runs from approximately 6000 yards down to zero and then begins over again due to the mechanical arrangement of the cam that determines the super-elevation of the gun sight. This makes it possible for an operator to crank in either direction to attain a particular point in the tracking range. This he may do very quickly by using the fast speed gear ratio of the present invention, even though it means going backwards through the entire tracking range. If, however, it is desired to traverse the range slowly, he may reverse the direction of turning of the operating crank, which automatically engages the slow speed gear ratio, as will be described more fully hereinafter.

An object of the invention is to provide a means whereby either fast speed or slow speed operation of a tracking device for gun sights may be obtained by manual reversal of the direction of turning of the tracking device crank.

Another object of the invention is the provision of a ball arrangement for engagement with a gear drive ring to change the gear ratio of a gear train.

With the above and other objects in view the invention consists in the construction, combination and arrangement of parts as will be described more fully hereinafter.

Figure 1:
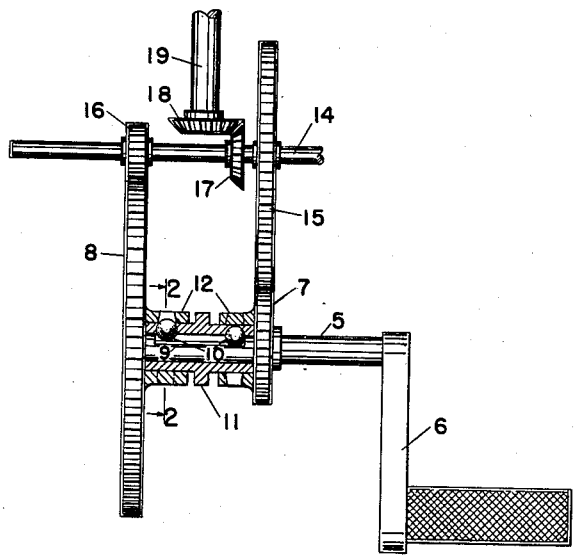
Figure 2:
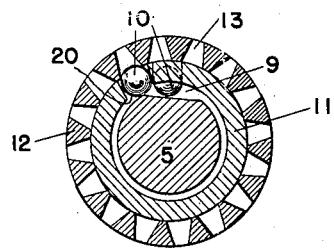

Reference is to be had to the accompanying drawings forming part of this specification wherein like reference characters indicate corresponding parts throughout the several views, and in which Fig. 1 is an elevation, partly in section, of a gear train, and Fig. 2 is a section on the line 2—2 of Fig. 1.

Referring more particularly to the drawings, 5 indicates a shaft rotatable by means of a crank 6 attached to one end thereof, and on which a slow speed driving gear 7 and a fast speed driving gear 8 are freely movable. A section of the surface of the shaft is cut away to provide a flattened portion 9, more clearly seen in Fig. 2, to support a pair of balls 10. A ball separator ring 11 is mounted on the shaft 5 so that the shaft may be rotated within the ring. The separator ring is provided with slots 20 in which the balls are individually and freely movable. Two gear driving rings 12, one fixedly attached to each of the gears 7 and 8, are provided with a series of ball receiving openings 13 equally spaced therearound, and which openings serially align with the slots in the ball separator ring so that the balls may protrude through the latter into the former to rotate the gear driving rings. Each of the ball receiving openings 13 in each of the gear driving rings, are of tapered shape larger at the inner periphery of the gear driving ring and smaller at the outer periphery thereof. The portions of each gear driving ring between the ball receiving openings thereof are tapered inwardly to a reduced size at the inner periphery of the ring. This structure insures immediate protrusion of a portion of a ball into one of said tapered openings when lifted by the rotation of the flat shaft. A second shaft 14, suitably journaled, has secured to it a large gear 15 meshing with the slow speed gear 7, a small gear 16 meshing with the fast speed gear 8, and a driving gear 17 engaging with a driven gear 18 mounted on a shaft 19 leading to the sight elevation mechanism of a gun sight.

In operation, when the crank is rotated in a clockwise direction, the edge of the flattened portion 9 forces the left hand ball, as viewed in Figs. 1 and 2, through its respective slot in the ball separator ring so that it protrudes into one of the openings 13 in the adjacent gear driving ring, making a unitary structure to drive the fast rate gear 8. The only force exerted on the other, or right hand ball, is the inertia resistance of the gear driving ring, allowing it to drop into the space between the flattened portion of the shaft and the gear driving ring where it becomes inoperative. On reversing the direction of movement of the crank, the left hand ball drops down to an inoperative position, and the right hand ball is forced upwards by the opposite edge of the flattened portion of the shaft to protrude into one of the openings in the gear driving ring attached to the gear 7, thereby setting the slow speed gear into motion.

It will be understood that the above description and accompanying drawings comprehend only the general and preferred embodiment of our invention and that various changes in details of construction, proportion and arrangement of parts may be made within the scope of the appended claim and without sacrificing any of the advantages of our invention.

What we claim as new is:

A clutch for use with a gear train comprising a rotary shaft for operating said gear train, a section of the peripheral surface of the shaft being cut away to provide a flat planar portion, a ball separator ring mounted on said shaft so that said shaft may be rotated within said ring, said ring being provided with spaced apart slots therethrough, a plurality of balls of greater diameter than the thickness of the wall of said ball separator ring, one of said balls being disposed in each of said spaced apart slots and protruding inwardly of said ring in the space provided by the said flat planar portion of the shaft and in engagement with said flat planar portion of the shaft, said spaced apart slots being circumferentially offset relative to each other around the ball separator ring an extent such that when said shaft is rotated within said ring until one of the slots and its contained ball is adjacent to an edge of said flat planar portion of the shaft with the ball projecting outwardly of said ring, the other of said slots and its contained ball is disposed more centrally of said flat planar portion of the shaft where the space is deeper and with the ball entirely within the outer surface of the ring, freely mounted gear driving rings each surrounding a portion of said ball separator ring which contains a said slot and ball, each of said gear driving rings having a series of ball receiving openings therein each of a size to register with said slot and to receive a portion of said ball, so that upon rotation of said shaft in either direction, one of said balls is moved outwardly in a slot by an edge portion of said flat planar shaft portion and is caused to protrude beyond the outer surface of said ball separator ring and to be received in a ball receiving opening of a driving gear ring to effect a driving connection, while the other ball is disposed entirely within the outer surface of the ball separator ring.

GEORGE W. H. SUSSDORFF.
HARRY D. GOODNOW.

References Cited in the file of this patent

UNITED STATES PATENTS

| Number | Name | Date |
| --- | --- | --- |
| 1,494,611 | McGrew | May 20, 1924 |
| 1,895,822 | Rueckart | Jan. 31, 1933 |
| 1,991,756 | Lazich | Feb. 19, 1935 |
| 2,377,575 | Ringer | June 5, 1945 |

FOREIGN PATENTS

| Number | Country | Date |
| --- | --- | --- |
| 7,681 | Great Britain | Apr. 1, 1913 |
| 296,507 | Germany | Feb. 12, 1917 |
| 850,791 | France | Feb. 24, 1939 |